May 31, 1949.　　　　J. W. F. HOLL　　　　2,471,956
TORQUE EQUALIZING BRAKING APPARATUS
Filed April 2, 1945　　　　　　　　　　　2 Sheets-Sheet 1
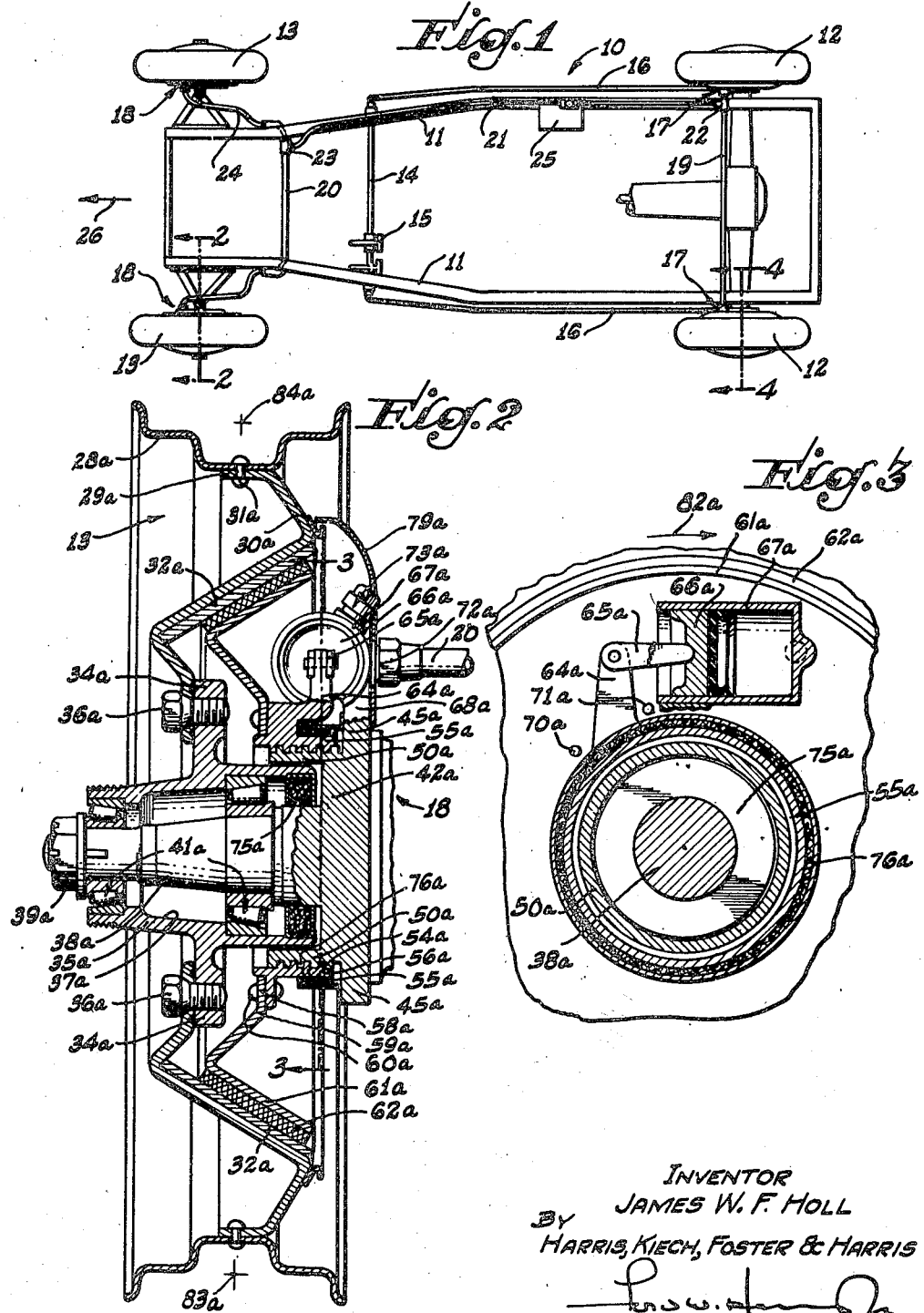
INVENTOR
JAMES W. F. HOLL
BY
HARRIS, KIECH, FOSTER & HARRIS
FOR THE FIRM
ATTORNEYS

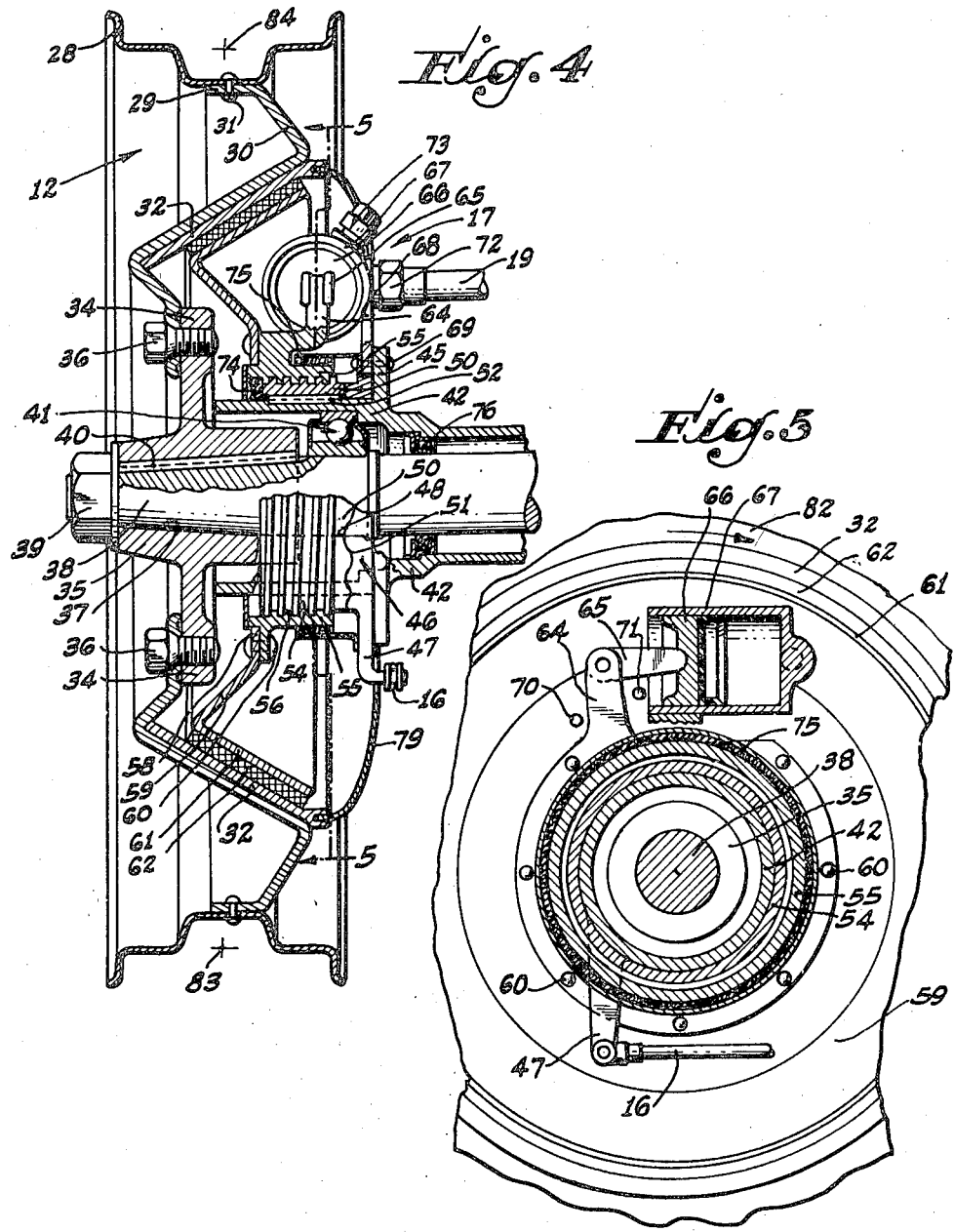

Patented May 31, 1949

2,471,956

UNITED STATES PATENT OFFICE 2,471,956

TORQUE EQUALIZING BRAKING APPARATUS

James W. F. Holl, Los Angeles, Calif.

Application April 2, 1945, Serial No. 586,101

8 Claims. (Cl. 188—2)

My invention relates to means for braking the wheels of a vehicle and, more specifically, to a device of this general character which incorporates a torque-equalizing means for communicating a uniform braking torque to each wheel of the vehicle.

The customary casual, and frequently erroneous, employment of the term "equalize," as applied to various braking systems, has resulted in a popular misconception thereof with frequent attendant confusion. An exact definition of the significance of the term is therefore essential to any consideration which is related thereto.

Many conventional braking systems which are employed at present ordinarily include a fluid-driven piston adapted for actuating a brake shoe to effect engagement thereof with a braking surface. The normal force acting at the interface between the brake shoe and the braking surface is proportional to the force exerted upon the piston by the fluid and is dependent upon the particular means involved in transmitting the force from the piston to the brake shoe. The fluid derives its motivating power from the potential energy developed therein by means of a pressurizing agency, which may include a power-driven reciprocating or rotary compressor, or a master piston as in the case of the conventional automotive hydraulic system. The pressurized fluid is delivered to the various braking assemblies by an interconnected system to insure application of an equal fluid pressure to each actuating piston involved. Since this system delivers a uniform fluid pressure to all actuating pistons, the normal forces acting at the interfaces between the respective coacting brake shoes and braking surfaces will all be identical and the braking system may properly be termed "force-equalizing."

However, the achievement of a force-equalizing braking system does not necessarily result in a system adapted for torque-equalization, since the latter requires that an equal braking torque be communicated to each wheel. The braking torque may be defined as the product of the normal force exerted on the braking surface by the brake shoe, the coefficient of friction therebetween, and a dimension representative of the distance from the center of the wheel to the effective center of the braking surface. It will be apparent that unless the coefficients of friction between the respective brake shoes and braking surfaces are identical, all other conditions being equal, the braking torques imparted to each wheel will not be equalized irrespective of the fact that force-equalization exists. Frictional coefficient variations are frequently encountered because of the varying quality of different sections of brake lining and extreme coefficient variations are common whenever non-uniform deposits of foreign material are inadvertently applied to the lining material, a familiar occurrence whenever an automobile is driven through accumulations of water, for example. Irregular braking torque distribution tends to cause a vehicle to swerve from a predetermined path and frequently makes control of the vehicle extremely difficult.

A primary object of my invention, therefore, is the provision of a means for braking the wheels of a vehicle by applying an equal braking torque to each wheel. I prefer to effect a realization of this objective by providing a means for effecting engagement between a brake shoe and a braking surface which will insure the application of an equal braking torque to each wheel by varying the normal force acting at the interface between the brake shoe and braking surface to compensate for variations of the coefficients of friction existing therebetween.

Another object of my invention is to provide a means for braking the wheels of a vehicle whereby a part of the energy of the vehicle is employed for the braking thereof and for achieving torque equalization.

An important achievement of my invention is the provision of a braking means requiring little or no compensation for wear and maladjustment.

A further object of the invention is to provide a braking means which furnishes the operator with a "feel" proportional to the force applied to the brake shoes.

A realization of these and other objects and advantages of my invention may be achieved by means of the embodiment thereof shown in the accompanying drawings, which are for illustrative purposes only, wherein:

Fig. 1 represents a plan view of the frame and wheels of a vehicle and illustrates an application of my invention thereto;

Fig. 2 is a vertical section through one of the wheels and is taken along the line 2—2 of Fig. 1;

Fig. 3 is a sectional view taken along the line 3—3 of Fig. 2;

Fig. 4 is a view similar to Fig. 2 representing a vertical section through another of the wheels and is taken along the line 4—4 of Fig. 1; and Fig. 5 is a view similar to Fig. 3 and is taken along the line 5—5 of Fig. 4.

Referring particularly to Fig. 1, the vehicle, indicated generally by the numeral 10, includes a frame 11 supported by wheels 12 and 13 which are mounted upon axles secured to the frame 11 in the usual manner. A rotatable shaft 14, attached to the frame 11, is actuable by a brake pedal 15 and adapted for exerting a tensile force upon brake rods 16 which are suitably connected to the ends of the shaft 14 by a means not shown but well known in the art. The brake rods 16 are also connected to braking assemblies 17 which are secured to the wheels 12, as will be discussed in detail hereinafter. The wheels 13 are also provided with braking assemblies 18, the braking assemblies 17 and 18 being interconnected by fluid lines 19 and 20, respectively, which are in turn interconnected by a fluid line 21 secured to the lines 19 and 20 by suitable fittings 22 and 23. The end portions 24 of the line 20 are preferably flexible to permit steering of the wheels 13 by a means not shown but well known in the art and the fluid line 21, which interconnects the breaking assemblies 17 and 18, is preferably provided with a suitable fluid reservoir 25 intermediate the fittings 22 and 23 substantially as illustrated.

Referring to Figs. 4 and 5, the wheel 12, which in this case is a driving wheel, is provided with an annular rim 28 which may be secured to a flange 29 of a member 30 by rivets 31, or otherwise as is well known in the art. The member 30 is preferably formed in a suitable manner to permit attachment of a braking surface 32 thereto by a means not shown but well known in the art, and the member 30 may be secured to the periphery of an annular flange 34 of a hub 35 by means of bolts 36 as illustrated. The hub 35 is provided with a tapered bore 37 therethrough which is adapted to receive an axle 38 therein, the hub 35 being retained on the axle 38 by means of a nut 39 in threaded engagement with the end of the axle 38. The hub 35 is rigidly secured to the axle 38 by means of complementary splines 40 formed on the peripheral walls of the bore 37 and on the axle 38, the splines 40 being adapted to transmit a rotary motion of the axle 38 to the wheel 12 whenever the former is rotated by a means not shown but well known in the art. The axle 38 is supported by a bearing assembly 41 disposed between the axle 38 and an axle housing 42 which is secured to the frame 11 of the vehicle 10 (not shown).

The axle housing 42 is provided with an annular flange 45 thereon abutting an actuating element 46 which may be rotated by means of a lever 47 pivotally attached to the brake rod 16, one end surface of the actuating element 46 having a plurality of cam projections 48 thereon which are preferably of sinusoidal form. A collar 50 is disposed adjacent the actuating element 46 and is provided with a plurality of cam projections 51 on an end surface thereof, the cam surface 51 being complementary to and adapted for engagement with the cam surface 48 of the actuating element 46. The collar 50 is adapted for axial displacement, i. e., displacement parallel to the axle 38, by means of splines 52 interconnecting the collar 50 and the axle housing 42, the splines 52 serving to prevent rotary, or angular displacement of the collar 50. External threads 54 are provided on the outer surface of the collar 50 and are complementary to internal threads 56 on a rotatable nut 55 which is in threaded engagement with the collar 50. The lead of the threads 54 and 56 is such that when the nut 55 is displaced angularly in the direction of rotation assumed by the wheel 12 during forward motion of the vehicle 10, the nut 55 will be displaced axially away from the wheel 12. The lead of the threads 54 and 56 is conventionally termed "left-hand" for wheels mounted on the left side of the vehicle 10 and "right-hand" for wheels mounted on the right side.

An annular flange 58 of a member 59 is secured to the nut 55 by means of rivets 60, the member 59 preferably being formed to provide an integral brake shoe 61 which may be faced with a suitable lining material 62 adapted for engagement with the braking surface 32 of the wheel 12, the lining 62 being attached to the brake shoe 61 by rivets in the usual manner. A lever 64 is attached to or formed integrally with the nut 55, the lever 64 being pivotally attached to a connecting rod 65 which is pivotally secured to a piston 66, the latter being slidably disposed in a fluid cylinder 67. The cylinder 67 has a bracket 68 extending therefrom which may be secured to the axle housing flange 45 by rivets 69, or otherwise as is well known in the art. Suitable stops 70 and 71 are preferably provided to limit the angular displacement of the lever 64 as will be discussed in detail hereinafter. The interior of the cylinder 67 communicates with the fluid line 19 which is secured to the cylinder 67 by means of a fitting 72 adapted for threaded engagement therewith in the usual manner (not shown). The cylinder 67 is preferably provided with a means 73 communicating with the interior thereof for bleeding the fluid system whenever desired. Suitable seals 74, 75 and 76 may be included to prevent leakage of a lubricant from the various surfaces requiring lubrication and a dust cap 79 may also be provided to exclude foreign matter from the braking assembly 17.

A complete comprehension of the operation of the two (left and right) braking assemblies 17, which are identical but inverted with respect to each other, may best be achieved by considering the braking action thereof with the assumption that the fluid line 21 is closed. Referring to Figs. 1, 4, and 5, if the vehicle 10 is moving forwardly, as indicated by the arrow 26, the wheel 12 will rotate in the direction indicated by the arrow 82 of Fig. 5 and the point 83 and tail 84 of an arrow in Fig. 4. In other words, the top of the wheel 12 in Fig. 4 will recede from and the bottom will advance toward the reader. When deceleration of the vehicle 10 is desired, the operator of the vehicle 10 depresses the brake pedal 15 which communicates a forward motion to the brake rods 16 by means of the rotatable shaft 14 to effect operation of the braking assemblies 17 in the following manner. The forward motion of the brake rods 16 effects an angular displacement of each actuating element 46 and the cam surfaces 48 and 51 cooperate to convert the angular displacements of the actuating elements 46 into axial displacements of the collars 50 toward the wheels 12 by virtue of the action of the splines 52. The axial displacements of the collars 50 urge the linings 62 of the brake shoes 61 into frictional engagement with the braking surfaces 32 and since the nuts 55 are free to rotate, the frictional engagement will cause angular displacements of the nuts 55 in the direction of rotation of the wheels 12, which causes the pistons 66 to develop a fluid pressure in the cylinders 67 and their interconnecting line 19. The angular displacements of the nuts 55 will also cause axial displacements thereof away from the wheels 12 which may be compensated for by further depressing the brake pedal 15 until the desired braking action is achieved. If both braking assemblies 17 are in proper mechanical adjustment so that the respective normal forces acting at the interfaces between the brake shoes 61 and braking surfaces 32 are equal and the respective coefficients of friction therebetween are equal, then the fluid pressures developed in the cylinders 67 will also be equal, and since the braking torque is directly proportional to the fluid pressure in the cylinders 67, the torques communicated to each of the wheels 12 will be identical. However, if the mechanical adjustments of or the coefficients of friction developed by the two braking assemblies 17 are unequal, the fluid pressures developed in the cylinders 67 will differ proportionately. The higher pressure will be communicated to the low pressure side by means of the interconnecting fluid line 19 until the pressure is uniform throughout the entire system. The pressure transfer will cause the low pressure piston 66 to rotate its nut 55 in a direction opposite to the rotation of the wheel 12 and the resulting axial displacement of the nut 55 towards the wheel 12 by virtue of the interaction of the threads 54 and 56 will cause the normal force acting between the brake shoe 61 and the braking surface 32 to increase until the torques communicated to each of the wheels 12 are equalized. Thus, the action of the fluid torque-equalizing system compensates for adjustment and friction coefficient inequalities by varying the normal forces acting between the brake shoes 61 and the braking surfaces 32 until torque equalization is effected. My invention therefore provides a torque-equalizing braking means which can tolerate any reasonable inequalities.

When release of the brakes is desired, the operator removes the actuating force from the brake pedal 15 which resumes its initial position by virtue of a spring (not shown) attached thereto in the usual manner. The actuating elements 46 return to their original position and the collars 50 are displaced axially into the position illustrated by virtue of the normal force acting between the brake shoes 61 and braking surfaces 32, the pressure of the fluid system being dissipated by angular displacement of the nuts 55 in a direction opposite to the direction of rotation of the wheels 12. If a more positive disengaging action is preferred, springs (not shown) may be employed to maintain the cam surfaces 48 and 51 in mutual contact at all times, as is well known in the art.

The stop 70 is preferably adjustable to permit the achievement of equalization under all operating conditions, particularly when the vehicle 10 is moving in a direction opposite to that indicated by the arrow 26. The adjustable stops 70 of the braking assemblies 17 are preferably suitably positioned so that incipient engagement between the brake shoes 61 and braking surfaces 32 exists during rearward motion of the vehicle 10 when the braking assemblies 17 are disengaged and the piston actuating levers 64 are in contact with the stops 70. When the brake pedal 15 is depressed, the cam surfaces 48 and 51 urge the brake shoes 61 into engagement with the braking surfaces 32 to apply an equalized braking force to the wheels 12, the stops 70 serving to prevent rearward rotation of the brake shoes 61. Occasional readjustment of the stops 70 may be necessary to insure efficient braking action for rearward motion of the vehicle 10.

The preceding description of the operation of the braking assemblies 17 was limited to the application thereof to a pair of wheels 12 for the purpose of simplifying the discussion and it will be understood that the inventive concept heretofore disclosed need not be limited to a pair of wheels.

I prefer, however, to employ part of the energy of the vehicle 10 to operate the braking assemblies 18 of the wheels 13 by utilizing the fluid pressure developed by the braking assemblies 17 of the wheels 12, the energy of the vehicle 10 being kinetic energy when the vehicle 10 is in motion and potential energy when it is stationary on an incline. Referring to Figs. 2 and 3, the wheel 13, which in this case is a driven wheel, and the braking assembly 18 are similar to the wheel 12 and braking assembly 17 which were described previously, and corresponding identifying numerals have been used which are followed by the letter "a" for the purpose of differentiation. Since the wheel 13 is a driven wheel, the hub 35a is not splined to the axle 38a but is mounted thereon by means of bearings 41a. Since the axle 38a is stationary, the collar 50a, which is also stationary, may be formed integrally with the axle 38a and is provided with external threads 54a thereon which are complementary to internal threads 56a on a rotatable nut 55a which is in threaded engagement with the collar 50a. The lead of the threads 54a and 56a is such that an angular displacement of the nut 55a will result in axial displacement thereof in the manner discussed in connection with the disclosure of the braking assembly 17. A brake shoe 61a, provided with lining 62a, and a piston 66a are attached to the nut 55a in a similar manner, the piston 66a being slidably disposed in a cylinder 67a which communicates with the fluid line 20 by means of a fitting 72a. Similar stops 70a and 71a, bleeding means 73a, seals 75a and 76a, and a dust cap 79a are also provided in the manner and for the purposes discussed heretofore.

When the braking assemblies 17 are actuated in the manner previously disclosed, the fluid pressure developed in the cylinders 67 by the pistons 66 is transmitted to the cylinders 67a of the braking assemblies 18 which are identical but inverted with respect to each other, by means of the fluid lines 19, 20 and 21. The fluid pressure thus transmitted actuates the pistons 66a which displace the nuts 55a angularly in a direction opposite to the direction of rotation of the wheels 13 as indicated by the arrow 82a of Fig. 3 and the point 83a and tail 84a of an arrow in Fig. 2. The angular displacements of the nuts 55a will cause axial displacements thereof toward the wheels 13 because of the action of the threads 54a and 56a until the brake shoes 61a engage the braking surfaces 32a with normal forces acting therebetween which are sufficient to develop braking forces that are equal and opposite to the forces offered by the pistons 66a. Thus each of the brake shoes 61 and 61a is adjusted by the action of the fluid system upon the pistons 66 and 66a until the pressure throughout the entire system is uniform and the braking torque applied to each of the wheels 12 and 13 is equalized.

As illustrated, the braking assemblies 18 of the wheels 13 are inoperable when the vehicle 10 moves in a direction opposite to the direction indicated by the arrow 26. The stops 70a are preferably adjustable to permit suitable positioning thereof to prevent engagement of the brake shoe 61a with the braking surfaces 62a during rearward motion of the vehicle 10.

My invention thus provides a means for communicating an equal braking torque to each of the wheels 12 and 13 of the vehicle 10 during forward motion thereof, irrespective of any reasonable inequalities existing between the braking assemblies 17 and 18. The invention further provides a braking means which employs part of the energy of the vehicle 10 for braking purposes and also provides an operator of the vehicle 10 with a "feel" which is proportional to the normal force acting between the brake shoes 61 and braking surfaces 32 for any operating condition.

It will be understood that the basic inventive concept disclosed herein may be modified without departing from the spirit of the invention. The specific embodiments described herein may be employed in various combinations and the employment thereof need not be limited to the particular combinations shown. Furthermore, it will be understood that the braking surfaces 32 and 32a and brake shoes 61 and 61a need not be of the conical type illustrated but may be of any other suitable configuration without departing from the spirit of the invention. Those skilled in the art will immediately recognize these and various other adaptations of the underlying concept and I do not intend to be limited to the specific disclosures contained herein, but am entitled to the protection offered by the full scope of my appended claims.

I claim as my invention:

1. In a braking mechanism, the combination of: a supporting structure providing an axis; a first brake member rotatable relative to said supporting structure about said axis; a second brake member adapted to frictionally engage said first brake member, said second brake member being rotatable relative to said supporting structure about said axis, and being movable axially relative to said supporting structure into frictional engagement with said first brake member, whereby said first brake member, when tending to rotate, tends to rotate said second brake member to develop a braking torque therein; actuating means including a non-rotatable body which is movable axially relative to said supporting structure for moving said second brake member axially relative to said supporting structure, said second brake member being rotatably mounted on said body so that none of the braking torque developed in said second brake member is transmitted to said actuating means; and means actuable by said braking member for developing a hydraulic pressure substantially proportional to the braking torque developed in said second brake member.

2. In a braking apparatus, the combination of: a supporting structure providing an axis; a first brake member rotatable relative to said supporting structure in forward and rearward directions about said axis; a second brake member adapted to frictionally engage said first brake member, said second brake member being rotatable relative to said supporting structure in said forward and rearward directions about said axis, and being movable axially relative to said supporting structure into frictional engagement with said first brake member, whereby said second brake member tends to rotate with said first brake member whenever said first brake member tends to rotate so as to develop a braking torque in said second brake member; actuating means including a non-rotatable member which is slidable axially relative to said supporting structure for moving said second brake member axially with respect thereto, said second brake member being threadedly connected to said non-rotatable member so as to be rotatable relative thereto about said axis whereby none of the braking torque developed in said second brake member is communicated to said actuating means, the threads connecting said second brake member and said non-rotatable member having a lead such that said second brake member tends to move axially out of engagement with said first brake member when it tends to rotate in said forward direction; and means actuable by said second brake member for developing a hydraulic pressure substantially proportional to a braking torque developed in said second brake member.

3. A braking apparatus as set forth in claim 2 wherein said non-rotatable member is provided with cam projections thereon, and wherein said actuating means includes an actuating member which is rotatable relative to said supporting structure about said axis and which is provided with cam projections thereon that are complementary to and engage said cam projections on said non-rotatable member, said cam projections cooperating to move said non-rotatable member axially toward said first brake member when said actuating member is rotated in one of said directions.

4. A braking apparatus in accordance with claim 2 wherein said pressure developing means includes a cylinder which is rigidly connected to said supporting structure, and includes a piston which is slidable in said cylinder and which is operatively connected to said second brake member.

5. A braking apparatus as defined in claim 2 including stop means carried by said supporting structure for limiting rotation of said second brake member in said rearward direction so as to limit axial movement of said second brake member toward said first brake member.

6. In a torque equalizing braking apparatus, the combination of: a supporting structure providing a plurality of axes; a plurality of primary brake members rotatable relative to said supporting structure in forward and rearward directions about said axes, respectively; a plurality of non-rotatable bodies on said supporting structure, said bodies being located adjacent said primary brake members, respectively, and being symmetrical about said axes, at least one of said bodies being slidable relative to said supporting structure along the axis corresponding thereto; a plurality of secondary brake members adapted to frictionally engage said primary brake members, respectively, said secondary brake members being threadedly connected to said non-rotatable bodies, respectively, so as to be rotatable relative thereto about said axes in said forward and rearward directions, the threads connecting said secondary brake members to said bodies having leads such that said secondary brake members all tend to move axially out of engagement with the respective primary brake members when said secondary brake members tend to rotate in said forward direction; actuating means for sliding said one non-rotatable body along the axis corresponding thereto relative to said supporting structure so as to move that one of said secondary brake members which is connected to said one body into frictional engagement with that one of said primary brake members which corresponds to said one secondary brake member, whereby said one primary brake member, when tending to rotate, tends to rotate said one secondary brake member to develop a braking torque therein, said threaded connection between said one body and said one secondary brake member permitting relative rotation thereof when a braking torque is developed in said one secondary brake member so that none of this braking torque is communicated to said actuating means; and means operatively interconnecting said secondary brake members for transmitting a braking torque developed in said one secondary brake member to the other of said secondary brake members.

7. A torque equalizing braking apparatus in accordance with claim 6 wherein said torque transmitting means includes means actuable by said one secondary brake member for producing a hydraulic pressure substantially proportional to a braking torque developed therein, and wherein said torque transmitting means includes means actuable by such hydraulic pressure and operatively connected to the other of said secondary brake members for communicating the braking torque developed in said one secondary brake member to the other of said secondary brake members.

8. In a braking apparatus, the combination of: a supporting structure providing an axis; a first brake member rotatable relative to said supporting structure about said axis; an actuating member carried by said supporting structure and movable axially relative thereto toward and away from said first brake member; a second brake member carried by said actuating member and movable into frictional engagement with said first brake member during axial movement of said actuating member toward said first brake member, said first brake member developing braking torque in said second brake member whenever said second brake member frictionally engages said first brake member during rotation of said first brake member, and said second brake member being rotatable relative to said actuating member so that none of the braking torque developed in said second brake member is communicated to said actuating member; cooperating means on said actuating and second brake members for moving said second brake member axially relative to said actuating member during rotation of said second brake member relative to said actuating member; means for moving said actuating member axially relative to said supporting structure; and means actuable by said second brake member for developing hydraulic pressure variable with the braking torque developed in said second braking member.

JAMES W. F. HOLL.

REFERENCES CITED

The following references are of record in the file of this patent:

UNITED STATES PATENTS

| Number | Name | Date |
|---|---|---|
| 1,502,111 | Molyneux | July 22, 1924 |
| 1,523,795 | Wassell | Jan. 20, 1925 |
| 1,639,320 | Wellman et al. | Aug. 16, 1927 |
| 1,718,021 | Andrews | June 18, 1929 |
| 2,020,809 | Stack | Nov. 12, 1935 |
| 2,063,444 | Lambert | Dec. 8, 1936 |
| 2,109,722 | Fawick | Mar. 1, 1938 |

FOREIGN PATENTS

| Number | Country | Date |
|---|---|---|
| 226,938 | Great Britain | Jan. 8, 1925 |
| 510,993 | France | Sept. 16, 1920 |